(12) United States Patent
Vaccari

(10) Patent No.: US 12,465,013 B2  
(45) Date of Patent: Nov. 11, 2025

(54) COUPLING ELEMENT FOR THE CONNECTION BETWEEN ADJACENT GRILLED WALLS OF A PET CAGE

(71) Applicant: Ferplast S.p.A., Castelgomberto (IT)

(72) Inventor: Nicola Vaccari, Castelgomberto (IT)

(73) Assignee: Ferplast S.p.A., Castelgomberto (IT)

( * ) Notice: Subject to any disclaimer, the term of this patent is extended or adjusted under 35 U.S.C. 154(b) by 330 days.

(21) Appl. No.: 17/926,547

(22) PCT Filed: May 10, 2021

(86) PCT No.: PCT/IB2021/053946  
§ 371 (c)(1),  
(2) Date: Nov. 18, 2022

(87) PCT Pub. No.: WO2021/240277  
PCT Pub. Date: Dec. 2, 2021

(65) Prior Publication Data  
US 2024/0008445 A1    Jan. 11, 2024

(30) Foreign Application Priority Data

May 26, 2020 (IT) .................. 102020000012400

(51) Int. Cl.  
*A01K 1/02* (2006.01)  
*A01K 1/03* (2006.01)  
(Continued)

(52) U.S. Cl.  
CPC ............ *A01K 1/033* (2013.01); *F16B 5/0084* (2013.01); *F16B 5/0614* (2013.01);  
(Continued)

(58) Field of Classification Search  
CPC ......... Y10T 403/7176; Y10T 403/7141; F16B 2/22; F16B 5/0614; F16B 7/0433; A01K 1/0245; E04H 17/05  
See application file for complete search history.

(56) References Cited

U.S. PATENT DOCUMENTS

| | | | |
|---|---|---|---|
| 4,765,495 A | * | 8/1988 | Bisk .......................... A47F 5/13 24/336 |
| 4,966,487 A | | 10/1990 | Sinkoff |

(Continued)

FOREIGN PATENT DOCUMENTS

| | | | | |
|---|---|---|---|---|
| DE | 36 34 543 | * | 4/1988 | ............. A47B 96/06 |
| EP | 0 499 146 | * | 2/1992 | ............... H01R 4/18 |

(Continued)

OTHER PUBLICATIONS

International Search Report for PCT Application PCT/IB2021/053946, Aug. 11, 2021, 4 pages.

*Primary Examiner* — Michael P Ferguson  
(74) *Attorney, Agent, or Firm* — FERENCE & ASSOCIATES LLC

(57) ABSTRACT

A coupling element (10) for the connection between a first grilled wall (P') and a second grilled wall (P") adjacent and orthogonal to each other of a pet cage, comprising an elongated body (11) one side of which ends with an arched coupling appendage (12), and the opposite side with a head (13) comprising two further arched coupling appendages (15, 16) facing opposite sides of the body (11). Said arched appendages (12, 15, 16) define a first seat (14) and a second seat (18) for the coupling to two rods f1', T") forming part of the first grilled wall (P') and a third seat (18) for coupling to a third rod (T'") forming part of the second grilled wall (P") to which the first wall (P) is connected. The third seat (18) is associated with an elastic tongue (19) adapted to  
(Continued)

contrastingly retain said third rod (T''') of said second wall (P''') to which the first wall (P') is connected.

7 Claims, 4 Drawing Sheets

(51) Int. Cl.
*F16B 5/00* (2006.01)
*F16B 5/06* (2006.01)

(52) U.S. Cl.
CPC ....... *A01K 1/0245* (2013.01); *Y10T 403/7141* (2015.01); *Y10T 403/7176* (2015.01)

(56) References Cited

U.S. PATENT DOCUMENTS

| | | | | |
|---|---|---|---|---|
| 5,549,073 | A | * | 8/1996 | Askins ................... A01K 1/033 119/474 |
| 5,626,098 | A | | 5/1997 | Askins et al. |
| 8,341,808 | B2 | * | 1/2013 | Vermillion ................ F16B 2/22 24/336 |
| 8,733,293 | B2 | * | 5/2014 | Link ....................... F16C 11/04 24/339 |
| 11,497,190 | B2 | * | 11/2022 | Cantwell .................. F16B 7/22 |
| 2016/0174719 | A1 | * | 6/2016 | Saiga ................... B60N 2/5825 24/531 |
| 2018/0153300 | A1 | * | 6/2018 | Westcott ............... F16B 5/0685 |

FOREIGN PATENT DOCUMENTS

| | | | | |
|---|---|---|---|---|
| EP | 3262988 | A1 | 1/2018 | |
| FR | 2 547 381 | * | 6/1984 | ............. F16G 11/04 |
| GB | 2314833 | A | 1/1988 | |
| WO | 2021053384 | A1 | 3/2021 | |

* cited by examiner

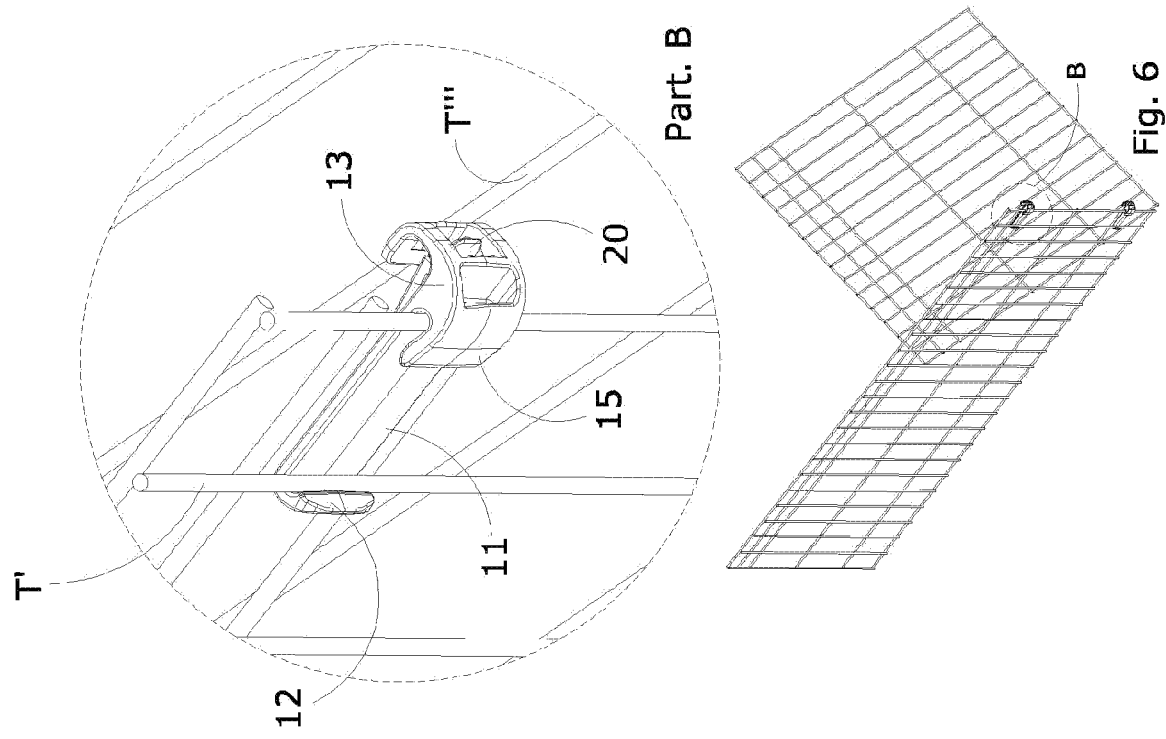
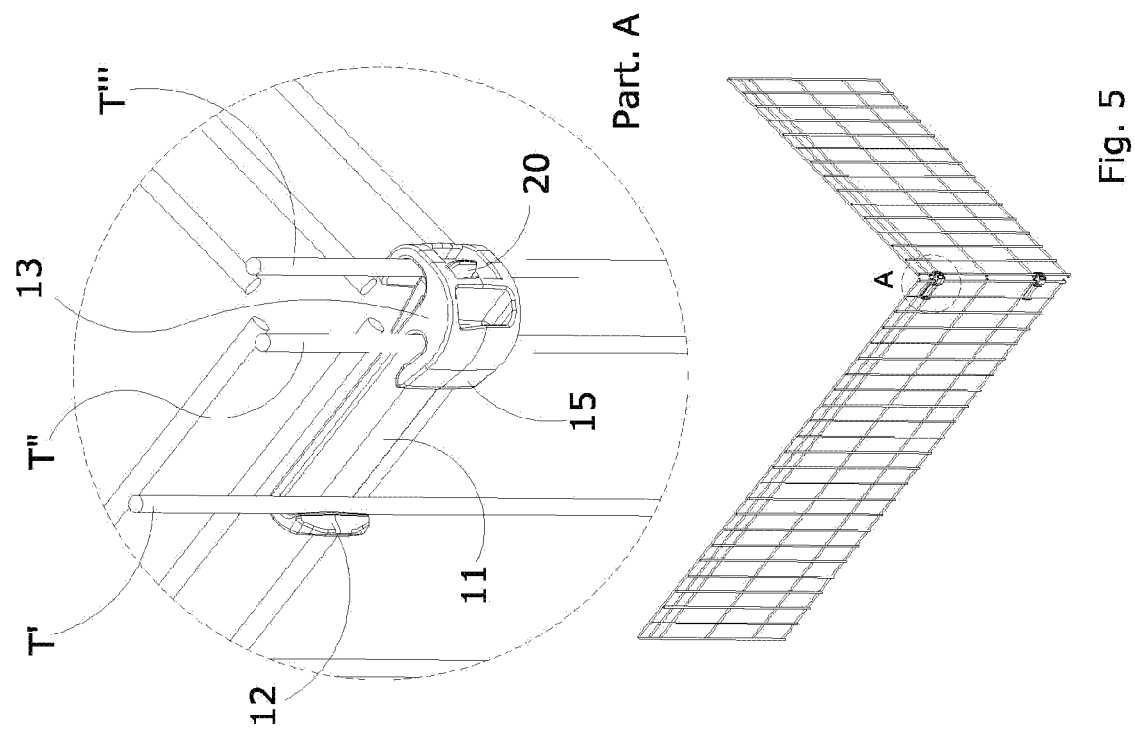

COUPLING ELEMENT FOR THE CONNECTION BETWEEN ADJACENT GRILLED WALLS OF A PET CAGE

The present application is a National Phase Entry of PCT International Application No. PCT/IB2021/053946, filed on May 10, 2021, which claims priority to Italian Application No. 102020000012400 filed on May 26, 2020, the contents of which are hereby incorporated by reference.

FIELD OF APPLICATION

The present invention relates to a coupling element for the assembly of cages used for the containment and transport of pets.

In particular, the coupling element according to the invention is usable for connecting the walls of cages comprising a base element represented by a blind panel associated with walls, dividers and base and cover elements of the grid type, the assembly of which allows to obtain cages for the containment of pets.

With respect to the known solutions, the coupling element according to the invention ultimately has the advantage of being able to ensure, at very low costs, the correct mutual fixing of a plurality of grilled base elements forming the cage, in order to obtain a cage which is easily mountable and, at the same time, perfectly stable during use.

The present invention is advantageously applied in the sector of components and accessories for pets, in particular in the sector of coupling systems of cages for the containment and transport of pets.

PRIOR ART

The use of cages is known, represented by containment structures for pets consisting of a base, a roof and four vertical walls arranged orthogonally side by side. Each of said components is made with different techniques, also based on use, but generally the vertical walls, as well as the base and the roof, are mostly made using grids formed by a plurality of horizontal and vertical metal rods which are spaced so as to form nets or grids which prevent the passage of the contained animal.

The base generally has the shape of a tray placed below and which serves as a basin for the bedding, in which it is possible to introduce sandy or granular material which, in addition to absorbing excrement, provides a warm and comfortable environment for the animal.

Traditional grilled-panel cages can be of the single-compartment type or multiple-compartment type separated by dividers, using internal grilled walls which are in turn retained therebetween through the use of traditional temporary fixing means between adjacent walls.

Such temporary fixing means for the assembly of the grilled walls of the traditional cages are represented by coupling elements or clamps couplable to the rods of the walls themselves.

Most grilled cages include that "U"-type couplings are used for the mutual retention of the walls, generally made of metal wire, which are welded in pairs on the vertical edges of the long sides of the cages, such as the front and rear, with the aim of increasing the mechanical strength of the product when assembled, as they counteract the force which an animal, even a large one such as a dog, can impart outwards from the inside.

These traditional type couplings are generally made of metal wire because, for the function thereof, they must be particularly robust, and they must also be permanently fixed to the net, which is why they are welded, and finally they must be particularly economical, since cages are highly price-sensitive products.

According to such known solutions, each cage of standard size comprises at least two couplings for each vertical edge, so eight couplings are arranged on the four corners of the cage. In larger models, even twelve could be used, both to increase mechanical strength and to prevent the bending of the front net at the centre and therefore the possible creation of a crack which can be dangerous for the animal.

All this entails both problems in terms of production costs, mainly due to the need to employ workers, and in terms of overall dimensions, since handling the front and rear nets with welded couplings is rather complex because they tend to interlock with each other, also occupying a certain volume, both in the transport of the finished product, and during the various storage and handling steps in the production steps, for example during the painting step.

Another problem encountered is that the traditional couplings known in the art, being made of metal wire, do not allow to maintain good precision both in the assembly steps and during use precisely because of the construction features thereof. As a result, assembled and ready-to-use products can be loose and unstable, giving the user a feeling of poor quality.

Furthermore, the direct iron-iron contact between the coupling and the edge of the side nets during the use of the product becomes particularly noisy and this is also noticeable during transport, since the vibrations related to the movement of the vehicle translate into a continuous clicking.

It has also been found that the traditional wire couplings have sharp points, since the difficult processes and the need to keep the costs thereof low, are at the expense of the quality level. The point where such roughness is present is particularly exposed to the consumer's hands, with the consequent risk of injury.

The traditional coupling means currently used ultimately have a considerable impact on the production costs of each cage, as they must be produced in very high quantities and must be welded one by one on the respective fixing points at the edges of each grilled wall, requiring a considerable use of labour by the operators involved in production.

GB 2314833 A discloses a storage container comprising a first panel forming a base and a pair of front and rear walls, a pair of second panels forming end walls, and a set of clips for fixing each second panel to the first panel. Preferably the panels comprise a wire net and preferably the clip comprises cavities for engaging the wire.

U.S. Pat. No. 5,626,098 A discloses a collapsible cage for dogs or rabbits having a rectangular base, fold-down end walls, folding side walls and a roof. The walls and roof consist of metal grids. The end walls fold on the base one on top of the other. The side walls fold into the accordion centre and are hinged at the top to the opposite edges of the roof, allowing the side walls and roof to collapse on the base above the end walls. The base has a removable tray or pan and an access door is included in one of the end walls. Releasable clips are provided to hold the walls and roof together in an elevated position of the structure.

EP 3262988 A1 discloses a connecting clip for a wire back panel shelving system with at least a first clip-in snap element for clipping onto a wire back panel portion of the wire back panel shelving system and with at least one suspension hook for suspending from a load-bearing shelf element or a column of the wire back panel shelving system.

U.S. Pat. No. 4,966,487 A discloses connectors for vertical end rectangular grids having spaced pairs of vertical end rails joined to horizontal rods extending between the end rails with vertical spaced rails between the end rails. Each connector includes a rigid, flat plate formed with two or more symmetrical notches spaced horizontally. Each notch has a passage extending inwards from an end edge of the plate. The passage ends at two opposite inner concave lobes, each of which slidably engages a respective vertical end rail. The passages allow the plate to move past the horizontal rods when the plate is moved along the end rails. A third inner lobe between the two opposite lobes allows the plate to pass the free protruding ends of the plates which can have two, three, four or more notches to retain the vertical grids in erect and independent angular arrays. The stop blocks can be positioned below the connectors to keep them in the desired positions on the rails supported by the horizontal rods protruding through the rails.

DESCRIPTION OF THE INVENTION

The present invention aims to provide a means for coupling grilled walls of cages for the containment of pets which can be made at extremely low costs and with obvious practical advantages, with the consequent possibility of eliminating or at least reducing the drawbacks described above.

More particularly, the coupling means according to the invention are made in a single body by moulding thermoplastic material, therefore of very simple construction, such as to significantly reduce the labour costs which have a rather evident impact on the realisation of the cages.

This is obtained through a coupling means for cages for containing domestic animals, the features of which are described in the main claim.

The dependent claims delineate advantageous embodiments of the invention.

The main advantages of this solution, in addition to all those deriving from the constructional simplicity thereof, firstly concern the fact that it is no longer necessary to fix metal coupling components by welding, and also eliminate the problems related to the interlocking of one net with the other in the production step with the consequence of a distinct saving in terms of labour.

The coupling element according to the invention has the advantage that, being made of plastic material, it has a flexible flap such as to act as an anchoring point for the vertical edge of the side net, so that it remains in the vertical position without further supports, facilitating all further assembly operations.

Furthermore, the particular features of the plastic material and the possibility of obtaining these components by injection moulding, offers the possibility of creating shapes which are well suited to their coupling to the net components, facilitating the assembly operations of the end consumer.

The coupling components according to the invention also allow to reduce transport volumes, as there are no protruding dimensions.

The manufacturer's workforce is also considerably reduced, with the consequent advantages of lower production costs.

A further advantage is the use of plastic material which allows precision to be achieved at the decimal, or even hundredth, level, which raises the quality level of the product, ensuring consistency throughout the production batch.

ILLUSTRATION OF THE DRAWINGS

Further features and advantages of the invention will become apparent from reading the following description of an embodiment of the invention provided by way of non-limiting example, with the aid of the drawings illustrated in the appended tables of drawings, in which:

FIGS. 5 and 6 show schematic views highlighting an angular coupling detail respectively in coupled and uncoupled condition;

DESCRIPTION OF AN EMBODIMENT OF THE INVENTION

Figure 1:
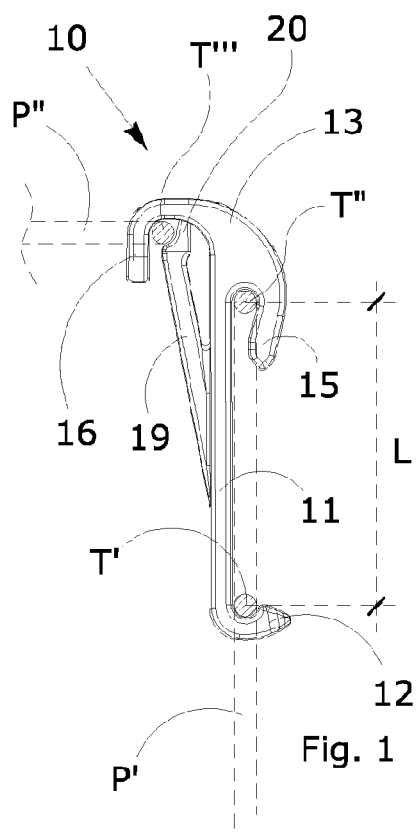
FIGS. 1 to 4 show schematic views highlighting the configuration of a coupling element according to the invention, seen from different angles.
Figure 2:
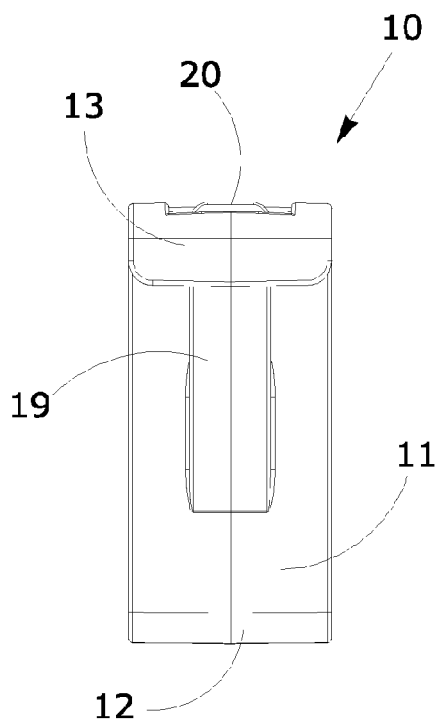
Figure 3:
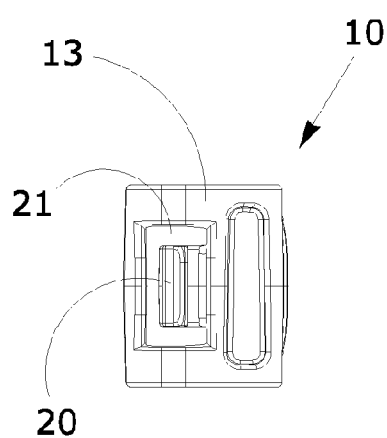

Referring to FIG. 1, the number 10 comprehensively indicates a coupling element which, according to the invention, allows to connect the angular sectors of vertical grilled walls of a cage for pets.

The coupling element 10 is made of thermoplastic material, i.e., by hot injection of molten plastic into a mould, one of the production techniques which allows to make many pieces in a short time, at low costs.

According to the embodiment depicted in FIGS. 1 to 4, the coupling element 10 has a central body 11 of substantially rectangular shape, one of whose sides ends with an arched portion 12 and the opposite side with a particularly shaped head 13.

More precisely, the arched portion 12 has a first seat 14 with a section substantially in the shape of an arc of a circle with a radius of curvature having dimensions corresponding to the radius of the rods T of a first net wall P' of the cage on which the coupling element is applied.

The angle of curvature of the arc of a circle of the seat 14 is less than 180° so as to allow the coupling and also the uncoupling with respect to the metal rods T of the net according to the application methods which will be described below.

The head 13 of the coupling element 10 has appendages 15 and 16 opposite the longitudinal plane of the body 11.

The appendage 15, which is elastic and flexible, defines a second seat 17 having section substantially in the shape of an arc of a circle with a radius of curvature having dimensions corresponding to the radius of the rods of the net of said first wall P' of the cage, and an extension angle greater than 180° to allow the retention of the rod contrastingly to the flexible appendage 15 according to the application methods which will be described below.

The measurement of the distance L between the axes of the two rods T present in said first and second seats 14 and 17 corresponds to the interaxis between two not necessarily adjacent rods of the mesh of the net of the first wall P' on which the first side of the coupling element is applied.

Figure 4:
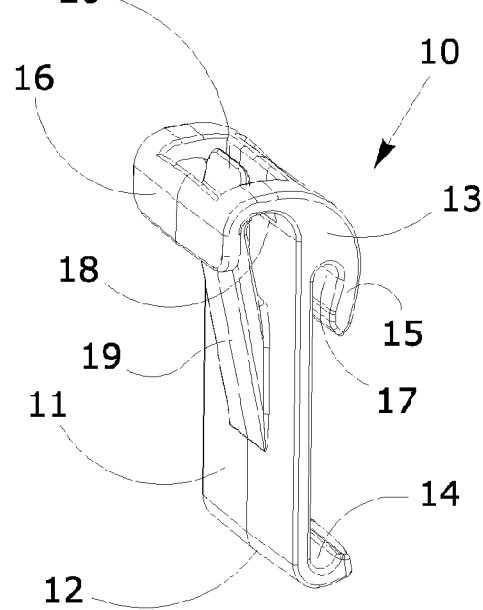
Figure 7:
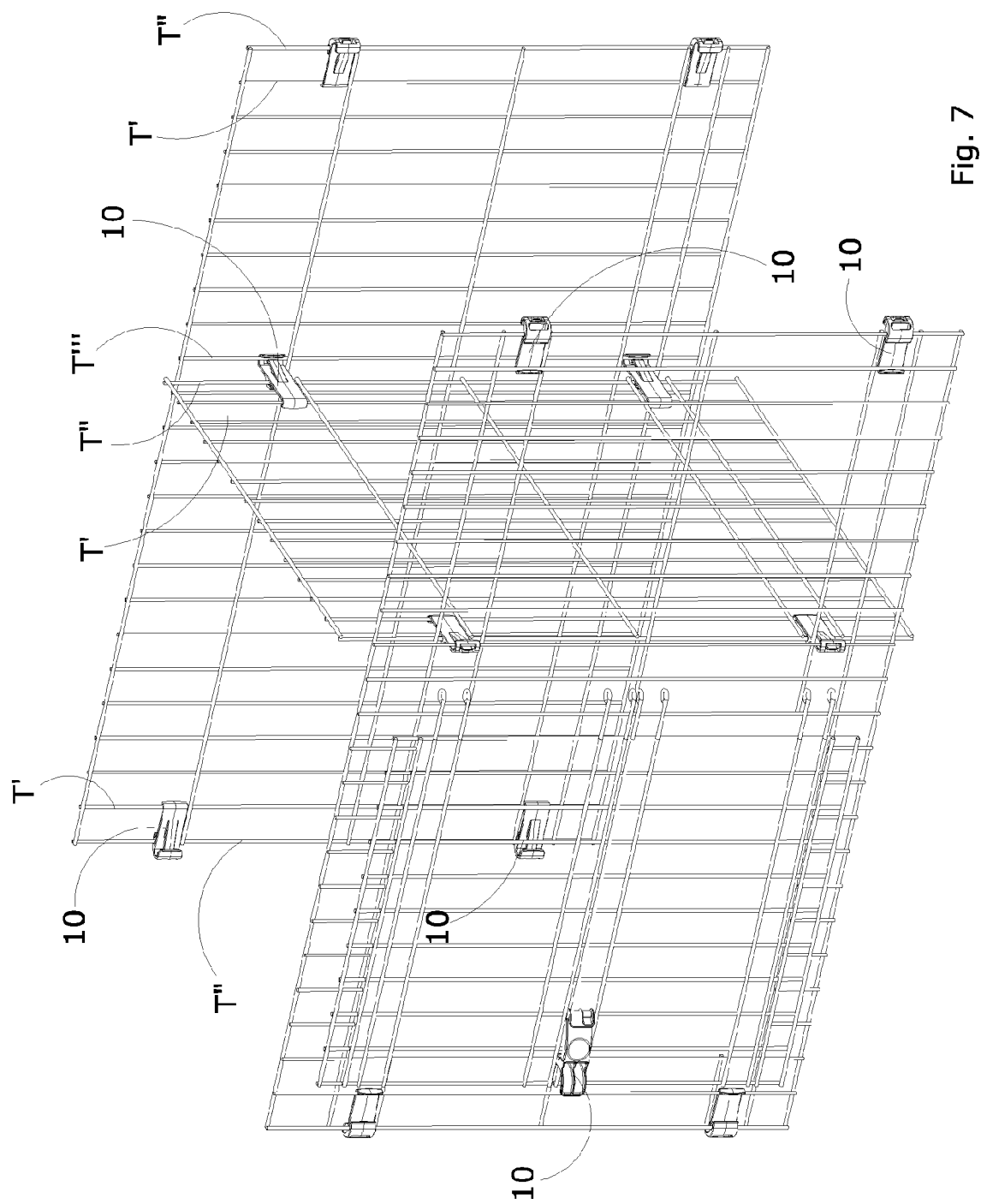
FIG. 7 shows a view of some grilled walls of a cage retained by the coupling elements according to the invention.
Figure 8:
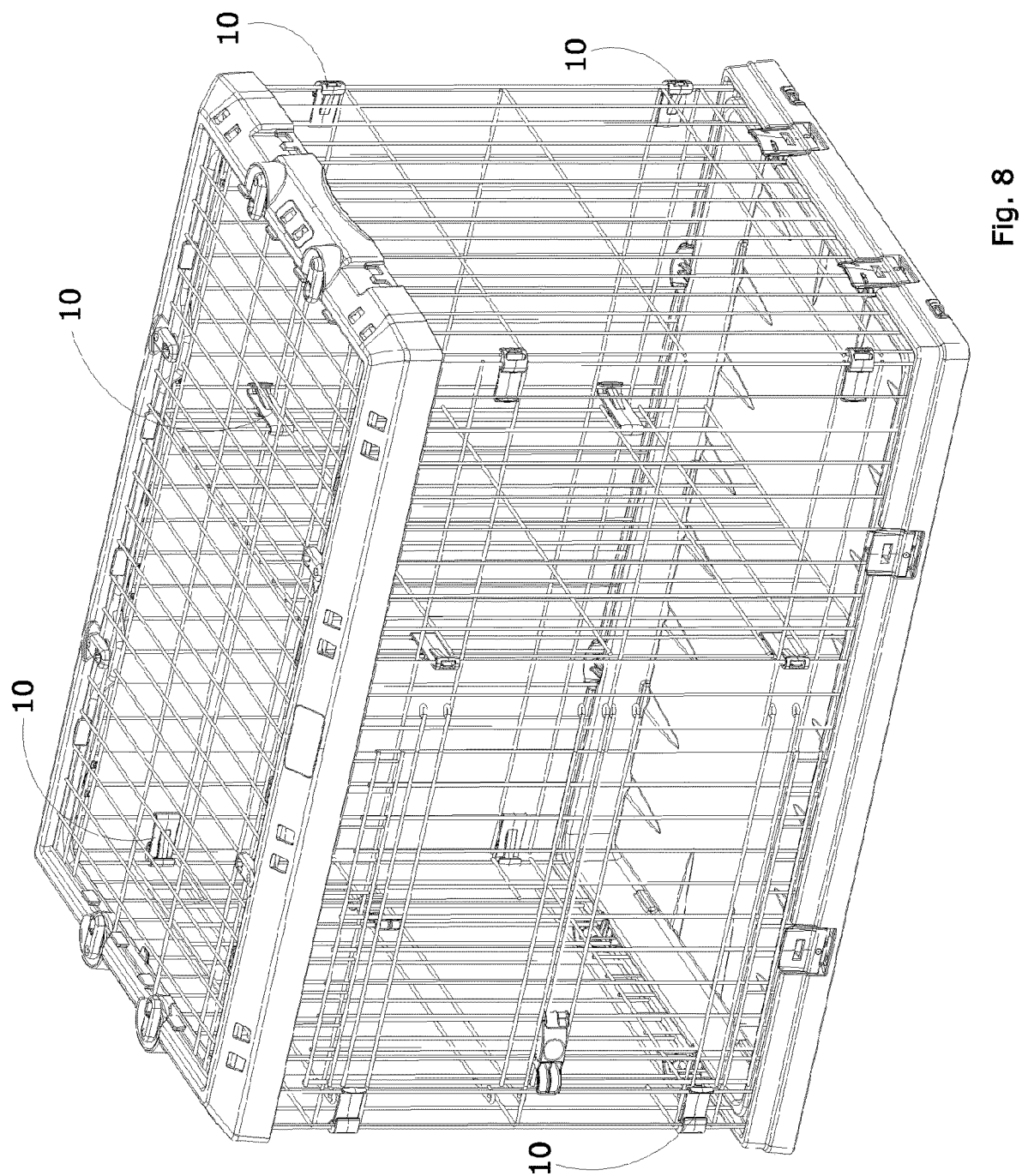
FIG. 8 shows a view of a complete modular cage made by connecting grilled modules retained by the coupling element according to the invention.

The second of the appendages present on the head 13 of the coupling element 10, i.e., that indicated with 16, defines a third seat 18, represented in FIG. 4 which, according to a feature of the invention, is associated with an elastic tongue 19 which extends in an oblique direction from the surface of the body 11 facing the appendage 16.

The elastic tongue 19 ends with the free end 20 thereof at the inner part of the third seat 18 defined by the appendage 16 and in this area has a concavity opposite the concavity of the seat 18, so as to retain a third rod T''' this time of the wall P''' to which the wall P' is associable orthogonally.

Advantageously, the end of the elastic tongue 19 exits for a certain length from an opening 21 (FIG. 3) obtained on the top of the head 13, so that it can be moved with fingers from a retaining position of the rod T''' to a release position of the same to allow it to be uncoupled.

From an operational point of view, the coupling element 10 according to the invention in a first step is coupled on one side of a first grilled wall P' by firstly introducing an end rod T'' into the seat 17 defined by the flexible appendage 15 and secondarily being locked on a respective inner rod T' which penetrates the seat 14 of the appendage 12, allowing the coupling element to remain retained on the first wall of the cage.

The next step includes the association and locking of the coupling element 10 to a second wall P''' by inserting the end rod T''' in the seat 18 defined by appendage 16; the end rod T''' locks in this position urged by the elastic tongue 19.

For the release of the grilled walls during disassembly and for the uncoupling of the element 10 it is sufficient to act on the end 20 of the elastic tongue whose retraction frees the rod T''' of the wall P''', while for the release of the wall P' it is sufficient to act on the appendage 12 which by releasing the rod T' also frees the rod T'' which can be removed from the seat 17.

This coupling can be made in different types of plastics, depending on the mechanical strength required and as a function of the strength of the animal which the cage must contain.

The coupling element 10 can therefore be made with multiple types of plastic, such as polypropylene for lower strengths, or technopolymers such as polyamide 6, polyamide 6,6 or acetal resins.

According to further possible embodiments of the coupling element 10, it can be used with the same principle, modifying only the type of fixing to the net, also in other points of the cage, such as the base, the roof or the door.

It is also included that the coupling element 10 can be advantageously used, possibly with the appropriate modifications, also to retain the dividers present inside these cages, to facilitate the coupling between the divider and vertical nets.

As can be noted, the coupling element described achieves all the advantages mentioned above and, in particular, being realisable by injection moulding, it can be made at particularly competitive costs, with very high production capacities.

A further advantage is given by the fact that when the product is assembled and in place, the coupling element is interposed between the edges, preventing direct iron-iron contact and therefore limiting, if not zeroing, clicks or noises in general.

In addition, injection moulding allows the creation of shapes without edges, sharp points and therefore dangerous areas for animals and consumers.

As the coupling component according to the invention is usable by the end consumer, the same can choose to apply the desired number thereof for each corner of the cage, depending on the size of the animal contained in the cage, the behaviour or age thereof.

The invention has been described in the foregoing with reference to a preferential embodiment thereof. However it is clear that the invention is susceptible to numerous variants which fall within the scope thereof, and which are technically equivalent.

The invention claimed is:

1. A coupling element connecting a first net wall and a second net wall adjacent and orthogonal to each other of a pet cage, comprising:

an elongated body, wherein the elongated body comprises one side of which ends with a first arched coupling appendage, and an opposite side with a head comprising a second arched coupling appendage and a third arched coupling appendage facing the first arched coupling appendage on opposite sides of the elongated body, wherein the first arched appendage and the second arched appendage and third arched appendages define a first seat and a second seat for coupling of a first rod and a second rod forming part of the first net wall, and wherein the third arched appendage defines a third seat for coupling to a third rod forming part of the second net wall to which the first wall is connected;

wherein the third seat is associated with an elastic tongue configured to retain the third rod of the second net wall to which the first net wall is connected, wherein the elastic tongue extends cantilevered in an oblique direction from a surface of the elongated body facing the third seat and ends with a free end at an inner area of the third seat comprising a concavity opposite a concavity of the third seat retaining the third rod, wherein the free end of the elastic tongue is located in correspondence of an opening obtained on a top of the head;

wherein the third rod is retained at a position at the concavity of the free end of the elastic tongue; and wherein the third rod is released from the position present in the concavity of the free end of the elastic tongue to uncouple the coupling element by utilizing fingers to exert pressure towards the elongated body of the coupling element on at least one of: the free end of the elastic tongue and the body of the elastic tongue.

2. The coupling element of claim 1, wherein the coupling element is made of thermoplastic material.

3. The coupling element of claim 1, wherein the first seat of said first arched coupling appendage has a section substantially in the shape of an arc of a circle with a radius of curvature having dimensions corresponding to the radius of rods of a first net wall of the pet cage on which the coupling element is applied.

4. The coupling element of claim 3, wherein the angle of curvature of an arc of a circle of the first seat is less than 180° so as to allow coupling and uncoupling with respect to the rods of the first net wall.

5. The coupling element of claim 3, wherein the second seat comprises a flexible appendage which has a section substantially shaped as an arc of a circle with a radius of curvature having dimensions corresponding to a radius of the rods of the first net wall of the cage, and an extension angle greater than 180° to allow a retention and uncoupling of the rod against a force exerted by the flexible appendage.

6. The coupling element of claim 1, wherein a measurement of a distance between axes of the first rod and the second rod which are present in the first and second seats corresponds to an interaxis between two parallel, rods of a mesh of the first net wall on which the coupling element is applied.

7. The coupling element of claim 1, wherein the free end of the elastic tongue exits for a certain length from the opening obtained on the top of the head.

\* \* \* \* \*